US010586174B2

(12) United States Patent
Lev

(10) Patent No.: US 10,586,174 B2
(45) Date of Patent: Mar. 10, 2020

(54) METHODS AND SYSTEMS FOR FINDING AND RANKING ENTITIES IN A DOMAIN SPECIFIC SYSTEM

(71) Applicant: Gartner, Inc., Stamford, CT (US)

(72) Inventor: Gil Lev, Elkana (IL)

(73) Assignee: Gartner, Inc., Stamford, CT (US)

( * ) Notice: Subject to any disclaimer, the term of this patent is extended or adjusted under 35 U.S.C. 154(b) by 571 days.

(21) Appl. No.: 15/422,586

(22) Filed: Feb. 2, 2017

(65) Prior Publication Data

US 2017/0228461 A1 Aug. 10, 2017

Related U.S. Application Data

(60) Provisional application No. 62/291,029, filed on Feb. 4, 2016.

(51) Int. Cl.

| | |
|---|---|
| ***G06N 20/00*** | (2019.01) |
| ***G06F 17/27*** | (2006.01) |
| ***G06F 16/335*** | (2019.01) |
| ***G06N 5/02*** | (2006.01) |
| ***G06F 40/295*** | (2020.01) |

(52) U.S. Cl.

CPC ........... *G06N 20/00* (2019.01); *G06F 16/335* (2019.01); *G06F 40/295* (2020.01); *G06N 5/025* (2013.01)

(58) Field of Classification Search

CPC ...... G06N 20/00; G06N 5/025; G06F 17/278; G06F 16/335

See application file for complete search history.

(56) References Cited

U.S. PATENT DOCUMENTS

| | | | | |
|---|---|---|---|---|
| 2007/0208719 A1* | 9/2007 | Tran | ...................... | G06F 16/951 |
| 2009/0157652 A1* | 6/2009 | Barbosa | ................ | G06F 16/951 |
| 2011/0093449 A1* | 4/2011 | Belenzon | ............... | G06N 7/005 707/708 |

(Continued)

OTHER PUBLICATIONS

Finkel, et al., "Nested Named Entity Recognition", Computer Science Department, Stanford University [online], 2009, [retrieved on Feb. 10, 2017], Retrieved from the Internet: <URL: http://nlp.stanford.edu/pubs/nested-ner.pdf > , 10 pages.

(Continued)

*Primary Examiner* — Albert M Phillips, III

(74) *Attorney, Agent, or Firm* — Lipsitz & McAllister, LLC

(57) ABSTRACT

The present invention encompasses computerized methods and systems for finding and ranking domain-specific entities in a text-based inquiry. Existing text data sources are analyzed to create a training set of data comprising ranked entities with associated weighted features within each of a plurality of domains. The training set of data for each of the plurality of domains is stored in a ranked entities database. A text-based inquiry may be received from a user and analyzed, within a specific one of the domains, to locate candidate words or phrases based at least in part on the ranked entities in the specific domain. The candidate words or phrases can then be ranked based on the features for corresponding entities from the training set. The ranked candidate words or phrases can be stored in a ranked candidate database for further use by at least one of an analyst or a recommendation engine.

28 Claims, 4 Drawing Sheets

Text Database 14
Sentence Extraction Module 16
Locate Initial Candidates Module 18
Locate Additional Candidates Module 22
Re-Analyze Module 26
Clean and Stem Module 28
Training Candidate Repository 20
Persons
Location
Products
12
Word Repository 24

(56) References Cited

U.S. PATENT DOCUMENTS

2016/0117386 A1* 4/2016 Ajmera .................. G06F 16/35
707/740

OTHER PUBLICATIONS

"Chapter 6 ANNIE: a Nearly-New Information Extraction System", GATE (General Architecture for Text Engineering) [online], date unknown, [retrieved on Feb. 20, 2017], Retrieved from the Internet: <URL: https://gate.ac.uk/sale/tao/splitch6.html#chap:annie>, 15 pages.

* cited by examiner

METHODS AND SYSTEMS FOR FINDING AND RANKING ENTITIES IN A DOMAIN SPECIFIC SYSTEM

This application claims the benefit of U.S. provisional patent application No. 62/291,029 filed on Feb. 4, 2016 which is incorporated herein and made a part hereof by reference.

BACKGROUND OF THE INVENTION

The present invention relates to methods and systems for finding and ranking entities (e.g., a concept, location, person, company, industry, occupation, document, product, item, and the like, including occupational jargon expressed as single terms or phrases) contained within a text-based inquiry received from a user. The inquiries may be, for example email inquiries submitted to a help-desk, technical support inquiries submitted via an online chat session, or a request or search query submitted via a recommendation system, and the like, or may comprise any type of human generated free text.

Recommendation systems typically maintain (i) a database of declared/explicit profiles of professionals, and (ii) a history of actions taken by professionals within a given field of expertise, and use the combination of (i) and (ii) to recommend, for example, items or peers or additional services. The item recommendations can include, for example, documents to be reviewed, news items and industry announcements, events to attend, search keywords that may be of interest, and the like. A key purpose of the recommendations is to increase engagement between the industry professionals and the entity providing the recommendations by maximizing the value of the recommendations to the end-user (the industry professional). One example of a recommendation engine is disclosed in Applicant's U.S. Pat. No. 8,661,034 entitled "Bimodal Recommendation Engine for Recommending Items and Peers", which is incorporated herein and made a part hereof by reference and which discloses methods, apparatus and algorithms for recommending items and/or peers in response to keyword searches.

Prior art methods and systems exist relating to entity extraction from text. For example, Stanford University has developed a method for Non Domain Specific Entity Recognition (see http://nlp.stanford.edu:8080/ner/). This prior art system uses closed lists and cannot find new names or other new terms. This system is also not domain specific.

It would be advantageous to provide an entity extraction system which is domain specific and which not only finds the entities, but also ranks them accurately according to importance within the text and within the corresponding domain. It would also be advantageous to provide an entity extraction system which does not rely on closed lists but which instead continuously evolves and expands its entity database over time based on inquiries it receives.

The methods and systems of the present invention provide the foregoing and other advantages.

SUMMARY OF THE INVENTION

The present invention relates to methods and systems for finding and ranking domain-specific entities (e.g., a concept, location, person, company, industry, occupation, document, product, item, and the like, including occupational jargon expressed as single terms or phrases) contained within a text-based inquiry received from a user.

One example embodiment of the present invention includes a computerized method for finding and ranking domain-specific entities in a text-based inquiry. In this example embodiment, existing text data sources are analyzed to create a training set of data comprising ranked entities with associated weighted features within each of a plurality of domains. The training set of data for each of the plurality of domains is stored in a ranked entities database. Once the training set of data is created, it can be used to analyze text-based inquiries from a user. For example, a text-based inquiry may be received from a user and analyzed, within a specific one of the plurality of domains, to locate candidate words or phrases based at least in part on the ranked entities in the specific domain. The candidate words or phrases can then be ranked based on the features for corresponding entities from the training set. The ranked candidate words or phrases can be stored in a ranked candidate database for further use by at least one of an analyst or a recommendation engine.

The analyzing of the existing text data to create the training set of data may comprise: determining known entities for each of the domains from existing stored data; determining training candidate words or phrases from stored human generated text by at least comparing text from the stored human generated text with the known entities; storing the training candidate words or phrases in a training candidate repository; ranking the training candidate words or phrases in the corresponding domain; and storing the ranked training candidate words or phrases as the ranked entities in the ranked entities database.

The comparing of the text from the stored human generated text with the known entities may comprise: extracting sentences from the stored human generated text which have less than a threshold number of capital letters; locating words or phrases from the extracted sentences that contain capital letters, with exception of an initial word of each of the extracted sentences; and comparing the located words or phrases starting with a capital letter with the known entities and storing any matches in the training candidate repository as the training candidate words or phrases.

The known entities may include at least one of a person's name, a company name, a product name, a location, and other pre-defined terms for the corresponding domain.

The determining of the training candidate words or phrases from the stored human generated text may further comprise: analyzing the text to locate words or phrases that come before and after the stored training candidate words or phrases; and comparing the words or phrases that come before and after the stored training candidate words or phrases with the known entities and storing any matches in a word repository.

In addition, the determining of the training candidate words or phrases may further comprise analyzing the words or phrases that come before and after the training candidate words or phrases to locate any repeatedly used words or phrases; and storing any repeatedly used words or phrases in the word repository. The text can then be reanalyzed using the words or phrases stored in the word repository to locate additional training candidate words or phrases and storing the additional training candidate words or phrases in the training candidate repository.

The method may further comprise running a cleaning process on the training candidate words or phrases. The cleaning process may comprise removing at least one of: most common English language words; words or phrases that appear more than a threshold amount in the stored human generated text; words having less than a threshold number of characters; and words or phrases meeting predefined criteria for the corresponding domain.

The method may further comprise running a stemming process on the remaining words or phrases. The stemming process may comprise reducing the words or phrases to a base form and adding the base form of the remaining words or phrases to the training candidate repository.

The ranking of the training candidate words or phrases in the corresponding domain may comprise: subjecting the training candidate words or phrases stored in the training candidate repository to a series of ontology rules to extract features of the training candidate words or phrases; and utilizing relative importance of the extracted features of the training candidate words or phrases in the corresponding domain in the ranking of the training candidate words or phrases.

The ontology rules may comprise at least one of: determining if the training candidate word is part of a phrase; determining a number of words in a phrase; determining whether the training candidate word is a noun, a proper noun, a verb, or an adjective; determining how often the training candidate word or phrase is used in the text; determining if the training candidate word is a person's name, a name of a location, a name of a product, a name of a company, or an abbreviation; determining if the training candidate word appears before or after a verb; and determining if the training candidate word or phrase is in a passive voice.

The extracted feature may comprise one of a word, a phrase, a part of a sentence, a proper noun, a verb, a person, a location, a product, a company, an abbreviation, or the like.

The ranking of the training candidate words or phrases in the corresponding domain may further comprise: defining clusters for each of the domains, each of the clusters comprising a group of words with importance in the corresponding domain; defining, for each cluster, a cluster center comprising a word with a high repetition of use in the text; and determining a distance between the training candidate word or phrase and the cluster center. The ranking may be further based on how close the training candidate word or phrase is to the cluster center.

In addition (or alternatively), the ranking of the training candidate words or phrases in the corresponding domain may further comprise determining term relationships for the training candidate words or phrases within a corresponding domain. The term relationships comprising at least one of: determining if the training candidate phrase contains any of the training candidate words or other of the training candidate phrases; determining how many times a training candidate word or phrase appears as a sub-portion in other of the training candidate phrases; determining how many portions of the training candidate phrase comprise other of the training candidate words or phrases; determining if the training candidate word or phrase is equivalent to another of the training candidate words or phrases; determining if the training candidate word or phrase is a same kind or type as another of the training candidate words or phrases; and determining if the training candidate word is part of another training candidate word. The ranking of the training candidate word or phrase may be increased in accordance with the determined term relationship and predefined characteristics of the determined term relationship.

A score may be defined for each feature of the training candidate word or phrase, and a normalization process may be applied to each of the scores for each of the features to normalize the scores. In addition, an algebraic weighting coefficient may be applied to the normalized score for the corresponding feature in order to raise or lower the ranking of the feature in the corresponding domain. The algebraic weighting coefficient may be determined based on machine learning from a training set manually created from a sampling of the training candidate words or phrases in the corresponding domain.

The analyzing of the text-based inquiry to locate the candidate words or phrases may comprise: extracting sentences from the text-based inquiry which have less than a threshold number of capital letters; locating words or phrases from the extracted sentences that contain capital letters, with exception of an initial word of each of the extracted sentences; and comparing the located words or phrases starting with a capital letter with known entities from the ranked entities database and storing any matches as candidate words or phrases.

The text-based user inquiry may be analyzed to locate words or phrases that come before and after the stored candidate words or phrases. The words or phrases that come before and after the stored candidate words or phrases may be compared with the known entities. Any matches can also be stored as candidate words or phrases.

The words or phrases that come before and after the stored candidate words or phrases may be analyzed to locate any repeatedly used words or phrases. Any repeatedly used words or phrases may also be stored as candidate words or phrases.

The text-based user inquiry may be reanalyzed using the stored candidate words or phrases to locate additional candidate words or phrases. Any additional candidate words or phrases located during at least one of the analyzing of the words or phrases that come before and after the candidate words or phrases or the reanalyzing of the text-based user inquiry may be stored as ranked entities in the ranked entities database.

The weighted features associated with the ranked entities may be applied to the corresponding candidate words or phrases to provide the ranked candidate words or phrases. The ranked candidate words or phrases may be sorted. The sorted and ranked candidate words or phrases may then be stored in the ranked candidate database.

The text-based user inquiry may be analyzed to determine the specific domain of the text based user inquiry.

The recommendation engine may recommend analysts, documents, or information sources in response to the text-based user inquiry based on the ranked candidate words or phrases. The ranked candidate words or phrases may be submitted to the recommendation engine as key words or phrases.

The ranked candidate words or phrases may be used to build a user profile for the user for use by the recommendation engine. The user may comprise one of an expert, an author, or the analyst.

The present invention also encompasses a computerized system for finding and ranking domain-specific entities in a text-based inquiry. The system may comprise one or more user devices adapted to be connected over a network, one or more databases accessible via the network, an application server comprised of a computer processor and memory adapted for analyzing existing text data sources obtained from the one or more databases to create a training set of data comprising ranked entities with associated weighted features within each of a plurality of domains, and a ranked entities database for storing the training set of data for each of the plurality of domains. The application server may be further adapted for: (a) receiving a text-based inquiry from a user via one of the one or more user devices; (b) analyzing, within a specific one of the plurality of domains, the text-based inquiry to locate candidate words or phrases based at least in part on the ranked entities in the specific domain; and (c) ranking the candidate words or phrases based on the features for corresponding entities from the training set. A ranked candidate database may be provided for storing the ranked candidate words or phrases. The system may also comprise at least one of an analyst interface and a recommendation engine adapted to receive the ranked candidate words or phrases and provide recommended analysts, documents, or information sources in response to the text-based user inquiry based on the ranked candidate words or phrases.

The system may include or enable additional features discussed above in connection with the various embodiments of the methods for finding and ranking domain-specific entities in a text-based inquiry.

BRIEF DESCRIPTION OF THE DRAWINGS

The present invention will hereinafter be described in conjunction with the appended drawing figures, wherein like reference numerals denote like elements, and.

DETAILED DESCRIPTION

The present invention relates to methods and systems for finding and ranking entities contained within a text-based inquiry received from a user. The inquiries are textual based inquiries, text-based requests for information from users (e.g., customers, clients, etc.), or any type of user generated free text. The entities located and ranked may be one or more of a concept, location, person, company, industry, occupation, document, product, item, and the like, including occupational jargon expressed as single terms or phrases. The inquiries may be stored in a database for analysis or further use (e.g., in a recommendation system such as that developed by Gartner, Inc. the owner of the present invention).

Such methods and systems for locating and ranking entities from a user inquiry may be used for the following purposes:

1) To find the most important parts in the inquiry text;
2) To find the most important topics that company analysts/experts are working on, and to build a more accurate bio profile for them;
3) To match keywords to analysts for searching databases or recommendation engines for inquiry responses;
4) To help a Customer Service Team to handle inquiries by determining the domain of the inquiry and the most important parts of the inquiry;
5) To enable recommendations for related content to be provided to the user based on the text context; and
6) To arrange and provide content generators (e.g., analysts or recommendation engines) based on most important topics or entities derived from inquiry text.

The following definitions are applicable to the present invention:

Domain—the context world or category of the inquiry or entity. For example, IT world, Medicine world, automotive world, and the like.

Entity—a distinguished unit, for example: A professional concept, a location, a person, a company, a drug, a document, a product, an item, and the like.

Ranking—In a given text, declaring that one entity is more important than another entity.

Text—Free text, written by a human. For example, a client's inquiry.

Configuration—a set of parameters with a unique value for a specific domain.

Trained data—a linguistic data model constructed for a specific domain.

The methods and apparatus of the present invention are directed towards finding, in a given domain, all of the entities ranked by importance inside a given text. All entities are found and ranked accurately within a domain specific ecosystem.

Accordingly, with the present invention, the underlying algorithm must work with a different configuration for every different domain. For example, the algorithm may build a new trained database for every different domain. Thus, the input text given to the algorithm must be in the same domain as the trained data.

Figure 1:
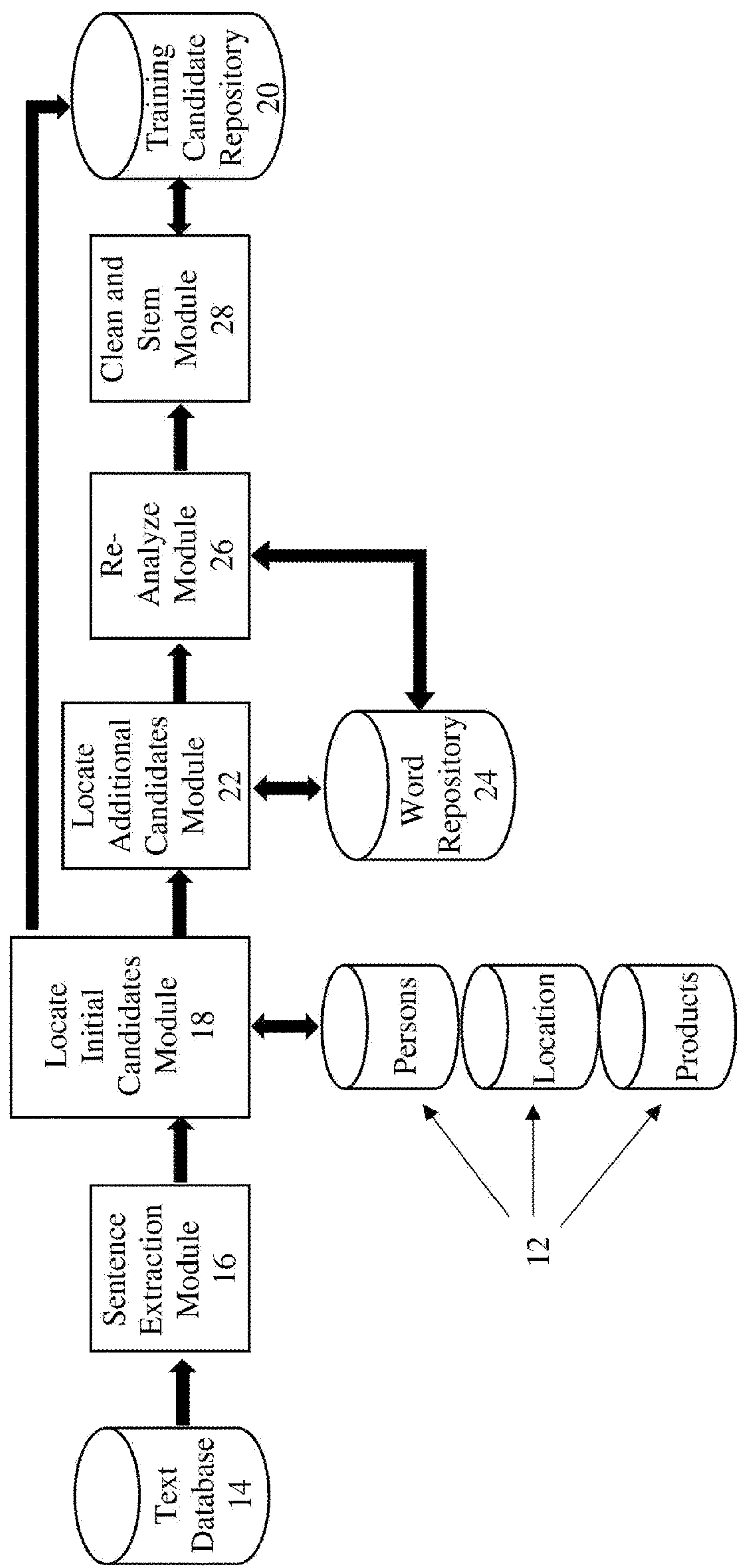
FIG. 1 shows a flow diagram of the extraction of entities from an existing data source in accordance with an example embodiment of the present invention.

In order to enable location and ranking of the entities from an inquiry, it is first necessary to build a training set of pre-calculated entities and determine their rank within each specific domain. An example embodiment of the process for extracting entities (also referred to herein as candidates) for use in the training set is described below in connection with FIG. 1.

1) Training data, in the form of existing databases 12 (e.g., such as Gartner, Inc.'s inquiry database or recommendation engine database) or other closed lists (such as those obtained from the Internet or other sources) are analyzed to determine known entities for a given domain. The domain may be determined by the source of the training data (e.g., training data from Gartner, Inc. will be within the business domain, training data from a car manufacturer will be in the automotive technology domain, and the like). These databases 12 may be divided by classification (e.g., persons, locations, products, and the like).

2) Then, using stored client or user generated text or inquiries (e.g., prior inquiries, emails, or other documents obtained from a free text database 14 such as a recommendation system database, also referred to herein as stored human generated text), training candidate words or phrases are extracted. In this step, for each stored text or inquiry, sentences that do not contain more than certain amount of capital letters are extracted (e.g. via a sentence extraction module 16). Sentences that include more than a threshold amount of capital letters are not considered as it may be overly confusing to determine names, locations, and other proper nouns from such sentences (e.g., where, for example, the user has used all capital letters or initial capitals for certain terms for emphasis).

3) For the extracted sentences, an initial set of training candidate words or phrases that start with capital letters are then located (e.g. via a locate initial candidates module 18). Such candidates should not include words with capital letters which occur at the beginning of the sentences. However, such candidates may include acronyms or other words comprised of all capital letters (even if located at the beginning of a sentence). The presence of a phrase may be determined based on known characteristics of phrases (e.g., such as a grouping of words repeated in the text or known to appear together, nouns appearing with corresponding adjectives and other POS (part-of-speech) tagging rules, or adjacent words in a sentence all starting with capital letters, and the like).

4) Each training candidate word or phrase is analyzed to see if it resembles a person's name, a location, a company, a product name or other known entity from among the known entities contained in database(s) 12. If matches to known entities are present, the training candidate word or phrase is stored in a training candidate repository (database) 20.

5) The text may then be analyzed to locate the words or phrases that come before or after the training candidate words or phrases to locate additional training candidate words or phrases (e.g., via a locate additional candidates module 22). If the type of the candidate word is known, then those candidate words are placed in word repository 24 by classification. After completion of this step, it can be determined that, for example, the word: "Mr." comes before a name of a person and the word "St." or "Street" comes after a street name.

6) Next, words or phrases that are found before and after the training candidate words or phrases are analyzed to locate additional training candidate words and phrases that do not begin with capital letters. Any repeatedly used words that are located are deemed to be "strong" words and are identified as additional training candidate words. A "strong" word can be any word that was used more than a certain amount of times in the sentence or inquiry. Strong words can also be used to identify an entity type. For example, assume the surname "Chang" does not appear in the word repository 24. If the term "Mr." appears a number of times in the text in front of "Chang" (and thus "Mr." is a deemed to be a strong word) it can be determined that "Chang" is a surname and it can be added to the word repository 24 as such. Any such additional training candidate words or phrases that are located are added to the word repository 24 according to classification.

7) The inquiry text may then be re-analyzed (e.g., via a re-analyze module 26) using the word repository 24 to locate all instances of the new training candidate words or phrases, using pre- and post-words. The training candidate words and phrases are counted and listed in a frequency table indicating how many times the word appears. Pre- and post-words can help identify a classification for the word (e.g., what is a person, a place, etc. (i.e., Mr. or Street)).

8) After all additional training candidate words or phrases are located, the candidates may be subject to a cleaning and stemming process (e.g., at clean and stem module 28). The cleaning stage involves removing from the candidate list: the most common English words; candidates that appear more than a threshold amount in the text database 14; short candidates (a short candidate is one that has a low threshold number of characters (e.g., Mr. xy cannot be a name as it is most likely too short and does not make sense, therefore it is deleted)); candidates according to predefined criteria within a domain (e.g., remove candidates that consists of all digits, and the like).

9) The stem stage involves, for each remaining candidate, running a stem function to reduce the word to its base form. All of the training candidates in the training candidate repository 20 may be replaced with the base form of the word. (E.g., "vendor management" and "vendor managing" would be reduced to the base form of "vendor manage" (or something similar) and treated/counted the same, as these terms would be interpreted as being equivalent). Optionally the base form of the words can be added to the training candidate repository without removing the corresponding original candidate words.

10) After the cleaning and stemming stages, the remaining additional candidate words are added to the training candidate repository 20 with the initial candidate words obtained from comparison with databases 12.

Figure 2:
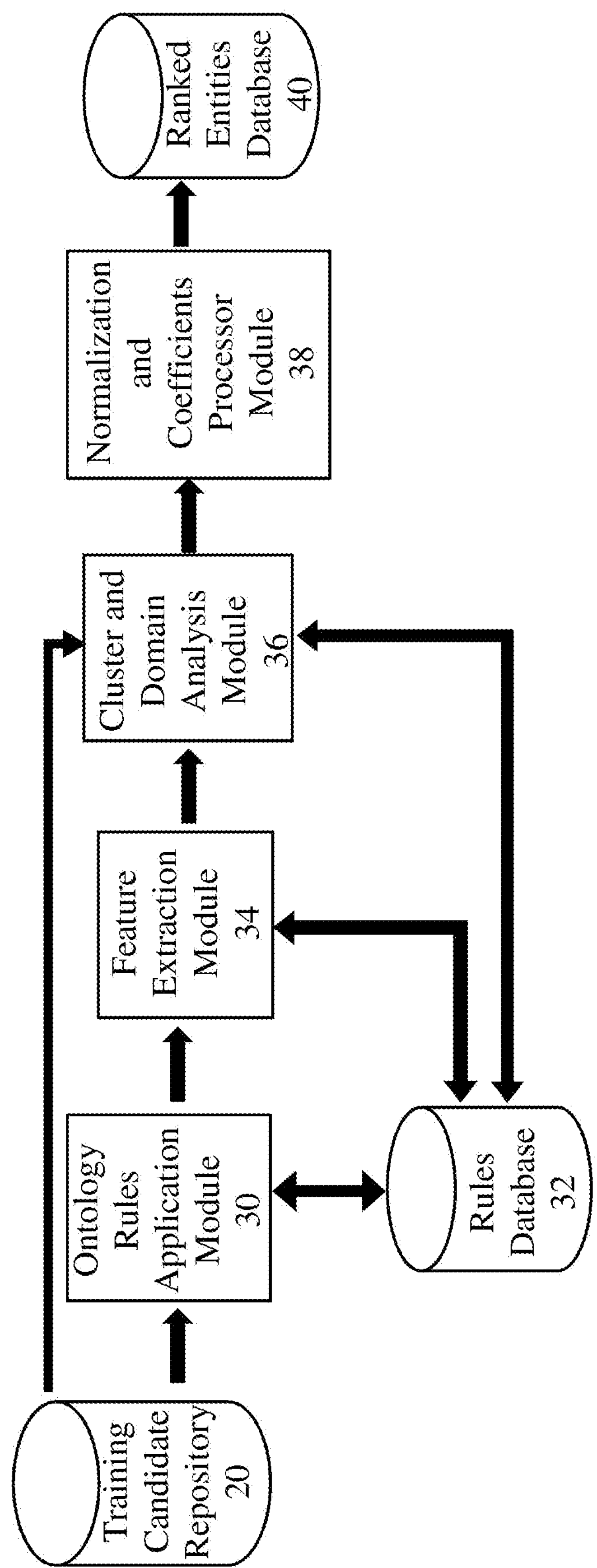
FIG. 2 shows a flow diagram of the creation of a training set of ranked entities in accordance with an example embodiment of the present invention.

Once the training candidate training set is determined, the training candidates can then be ranked within a domain specific area. In the ranking process, it should be appreciated that the same entity or candidate can have different importance in different domains (e.g., accuracy is important in a mathematical domain but may not be as important in a social domain or similar). For example, the entity or candidate can be analyzed to determine if it corresponds to a defined domain concept (e.g., "operating environments" may be a defined domain concept in a "computing business" domain). Any candidate or entity from the inquiry text that corresponds to a domain concept may be ranked higher than other terms (at least for rankings within that domain). An example embodiment of a ranking process in accordance with the present invention is described below in connection with FIG. 2.

The first step in ranking the training candidates within a domain is to determine various features pertaining to them. The training candidate words or phrases from the training candidate repository 20 are subject to ontology rules (e.g., via an ontology rules application module 30) from a rules database 32. Features of the training candidates are extracted (e.g. at a feature extraction module 34) after application of the ontology rules.

For example, the ontology rules for extracting features may include the following:

f1) isPhrase—this rule determines if the training candidate word is part of a phrase. Whether an entity is a word or a phrase is considered a feature for purposes of the algorithm.

f2) number of words in a phrase—if the word is part of a phrase, the number of words in the phrase is determined. It can then be determined whether, for a particular domain, long phrases are more important than short phrases, and vice versa (for later use in rankings).

f3) POS (part-of-speech) count based on, e.g., Penn Tree bank: for example NN (noun) count, JJ (adjective) count and so on to determine the type of word, e.g., proper noun, adjective, etc. This will help determine during the ranking process the more important types of words used in a domain (e.g., if adjectives or nouns are more important in a particular domain, etc.).

f4) Determine how many times the word or phrase appears inside the text or document (e.g., including but not limited to the number of pronouns related to it, how many times the word is used at a start of a paragraph out of how many paragraphs in the documents, etc.). Use of corresponding pronouns counts as an occurrence of the training candidate word. This will help determine the importance of a word or phrase in a specific domain in the ranking process.

f5) isPerson—this rule determines if the training candidate word corresponds to a person's name. This determination is needed for the calculation of the importance of a person or name in a particular domain.

f6) isLocation—this rule determines if the training candidate word is a location and is needed for the calculation of the importance of a location in a particular domain.

f7) isbefore or isafter verb—this rule determines if the training candidate word comes before or after a verb. Words coming before or after a verb may have different importance in different domains.

f8) ispassive voice—if verbs are present, this rule determines if the verb is passive voice. Whether or not passive voice is used may be of different importance in different domains.

f9) isProduct—this rule determines if the training candidate word is a product. Products may have different importance in different domains.

f10) isCompany—this rule determines if the training candidate word is a company. Company names may have different importance in difference domains.

f11) isabbreviation—this rule determines if the training candidate word is an abbreviation. The use of abbreviations may have different importance in different domains The extracted features will help to understand the relative importance of a training candidate word or phrase for ranking purposes in a particular domain. Each feature may have a different importance in different domains.

The extracted features may comprise a word, a phrase, a part of a sentence, a proper noun, an adjective, a verb, a person, a location, a product, a company, an abbreviation, and the like. The foregoing are examples only and additional features may be extracted using logic similar to that described above.

Once features are extracted, the training candidate words and phrases may be analyzed for importance in connection with clusters defined for each domain and then analyzed to determine domain specific features (e.g., via a cluster and domain analysis module 36). Each domain may be divided into sub domains. For example, in the automobile domain there may be an "engine" sub domain, with all of the engines parts and models, and also a "wheels" sub domain, with different tire and wheel products, pressures, terrain fitness, and so on. The clustering analysis helps to define sub domains within a larger domain, and also helps determine what is important and what is less important in each sub domain.

The cluster and domain analysis may be a separate and independent process from that of the feature extraction, and thus the cluster and domain analysis module 36 may obtain the candidate words and phrases directly from the training candidate repository 20 and/or the original training candidate words and phrases may be passed through the feature extraction module 34 to the cluster and domain analysis module 36.

A cluster is a group of words that tend to appear together and may be identified, for example, from training data (e.g., from an analysis of a storage bank of existing inquiries or other stored text). Clusters may be predefined for different domains. For example, in the soft drink industry/domain, the words: Cola, Pepsi, Coca, CO2, Zero, Sugar and Diet will tend to be used together. For each cluster, a cluster center is defined. The cluster center is a strong word that appears multiple times (e.g., "cola" may be defined as a cluster center as it may appear several times: Pepsi Cola, Coca Cola, Diet Cola, etc.). Training candidate words that are close to the center of the cluster can be identified. For each training candidate, the distance of the candidate from the closest center of a relevant cluster is measured. For example, assume that Pepsi and Cola are centers, the distance of the word "zero" from the closest center, which is "Cola" may be defined as a ratio of how often the candidate word appears together with the center word. An additional feature can be assigned to it:

f12) Distance of a training candidate from cluster's closest center. The closer to the center, the more important the candidate word. The phrase may be ranked by how close the candidate word is to a center term (note in a given domain, the center can be thought of as sub domain).

Next, a domain specific algorithm may be applied to collect domain specific features for ranking the training candidate words or phrases within the specific domain. For example, the algorithm may search for term relationships within a domain. Each time that a term assigned to a domain is determined to be related to a candidate, the score of the candidate within the domain can be raised, because it means that the candidate is more important within the domain. Further, the importance of the features attributed to that candidate can be raised as well. Thus, the determining of term relationships will affect rankings or importance of corresponding features in a given domain. For example, if the term "presidential family" is linked to Bill Clinton and Hillary Clinton, and alone these terms only have 25 occurrences each in the training set, together they would have 75 occurrences (25 for "presidential family", 25 for Bill Clinton, and 25 for Hillary Clinton), and the corresponding feature (person name) will be ranked higher in the corresponding domain.

Examples of such relationships may be as follows:

a) Phrase analysis: In this analysis, it is determined whether taking only a portion of the phrase gives us training candidates that have already been located. In other words, if a portion of the phrase appears as a separate candidate (already located training candidate word or phrase), the phrase is ranked higher (boosted). For example, if there is a phrase like: "controlled change management" it may be discovered that "change management" is also a candidate that is present in the training candidate repository 20 (or in the existing knowledge databases 12). This analysis can be performed for various portions of the same phrase.

Related rules may be:

f13) number of times a known candidate word or phrase appears as sub term or phrase in other training candidate phrases: In this analysis, for each portion (word or phrase) of the training candidate phrases, it is determined how many times this portion appears as a training candidate word or phrase. The higher the number of appearances, the higher the ranking that is applied. For example, if the text includes the following phrases "cloud computing company", "cloud computing service", and "hybrid cloud computing" it can be determined that the portion (or sub phrase) "cloud computing" is of importance, and so such sub phrases are ranked higher. The same analysis can be applied to individual terms of the training candidate phrases (e.g., in this case, the terms "computing" and/or "cloud").

f14) number of known sub terms appearing within this training candidate phrase—how many portions or separate parts of the phrase appear as known training candidates. The higher the number of portions that appear as separate candidates, the higher the ranking that is applied.

b) Analyze the training candidate words for an "is" relation. In this analysis, it is determined if any of the training candidate words have equivalent terms in the domain. For example, find SaaS as being equivalent to "Software as a Service". Thus, the relation can be defined as X is same type of Y.

For each such rule the frequency count and ranking for both X and Y is updated. This applies to both a word or a phrase as a feature. Related rules may be:

f15) factor to update X f16) factor for update Y

Thus, each equivalent term or phrase affects the importance/ranking of the other: If X is boosted in the rankings, so is Y.

c) Analyze the training candidate words for "kind" relations: In this analysis, it is determined if the candidate word is the same kind or type as another candidate word. For example, in the phrase "It is available in many countries like: Spain, Italy and Germany", Spain, Italy and Germany are all countries and so are the same kind (country) but not the same thing. Thus, the relation can be defined as X[i] is kind of X[j] for i≠j (where, in the example provided, X stands for country, i stands for Spain, and j stands for Italy). For each such rule the frequency count and ranking for all X[i] and X[j] is updated. Related rules may be:

f17) factor to update each kind determined by "kind of" rules

Thus, each term located in a kind relationship may be ranked as more important: If "i" is boosted, then so is "j".

d) Analyze the training candidate words to determine any "Part of" relations: In this analysis, it is determined if the candidate word is a part of or encompassed by another candidate word. For example, it may be defined that "Computer" consists of CPU, mother boards, array of disks. Thus, the relation can be defined as Y consists of X[i]. For each such rule Y and its X[i] component are updated when such candidates are encountered. Related rules may be as follows:

f18) factor for update Y score each time X[i] encountered.

f19) factor to update x[i] each time Y encountered.

Thus, the ranking for each term located in a "part of" relationship can be boosted.

Based on the relationships, the corresponding features of the entity or training candidate words or phrases may be ranked higher.

Next, for each feature located (whether via feature extraction module 34 or cluster and domain analysis module 36), a normalization process is applied to the score (e.g., in a normalization and coefficients processor module 38). The score may be normalized by using:

$$\text{Normalized }(f_i) = \frac{f_i - E_{min}}{E_{max} - E_{min}}$$

Where f is the score for a particular feature, and $E_{max}$ and $E_{min}$ define the maximum and the minimum, respectively, of the range of values of the possible scores. Thus, the score is normalized to be less than 1 for each feature. For example, given a score of 25 for a feature, and a range of possible scores from 20-50, the score for the feature can be normalized as follows: (25−20)/50−20=0.16.

For each of the features, algebraic coefficients may be provided for weighting purposes according to a specific domain. For this purpose, a new document set consisting of a sampling of training candidate words is created. For example, a sampling of the training candidate words may be obtained from the training candidate repository 20. A human reviews the document set and ranks the candidate words by order of importance. For example, a human with knowledge of the domain reads the text and ranks the entities by importance, creating a training set for a machine learning algorithm. As an example, in the "political" domain, names may be deemed quite important and so the human would rank names higher than other entities (e.g., concepts or places, which may be deemed less important) in the set of candidate words. Based on this human ranking of the sample training candidate word set, the machine learning algorithm would apply similar rankings to the remaining training candidate words. The machine learning algorithm may be, for example Perceptron (or other custom algorithms), used in order to find the algebraic coefficients for each feature. The result is an algebraic formula that gives a coefficient for each feature.

$$\text{candidate score} = \prod_{k=1}^{n} A_k \cdot f_k$$

With $A_k$ representing the coefficient and $F_k$ representing the feature. The higher the score, the higher the ranking and thus importance within a domain.

Thus, machine learning is used to boost the weight/ranking for each feature in each domain. The features may be ranked by importance, for example:

Boost x applied to feature 1 (e.g., person name)

Boost y applied to feature 2 (e.g., company name)

The weightings may indicate importance in a domain, number of occurrences of a term or phrase, and the like.

The result of the foregoing is a training set of data with established coefficients for ranking various features per domain, stored in a ranked entities database 40. The training set of data will include not only the ranked entities, but also the features and corresponding coefficients/weightings for the features, which may be determined for multiple defined domains.

Figure 3:
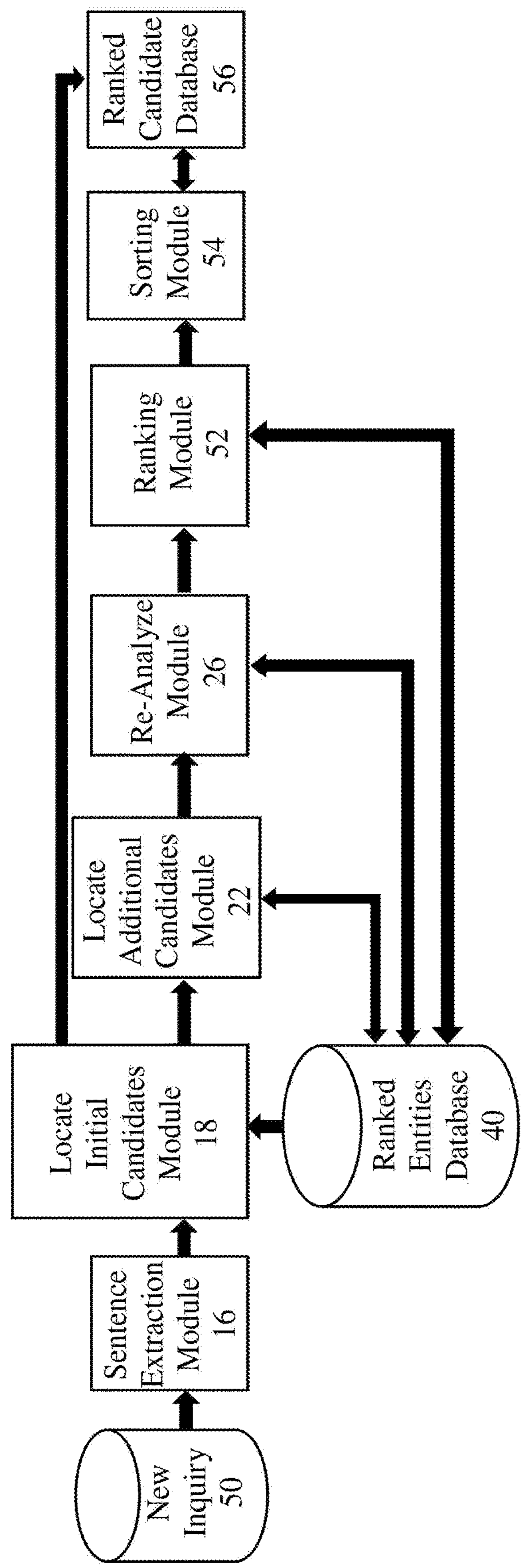
FIG. 3 shows a flow diagram of the processing of an inquiry to determine ranked entities from the inquiry, in accordance with an example embodiment of the present invention.

Once a training set of ranked entities and weighted features has been created (stored in database 40), new client/user text-based inquiries can then be analyzed. The text-based inquiries are analyzed within a specific domain, based at least in part on the ranked entities from the training set for the specific domain, in order to locate candidate words or phrases. When analyzing a new inquiry from a user, the same process as described above in connection with FIGS. 1 and 2 is applied. The only difference is that with new inquiries, there is no need to calculate the coefficients for the various features, as this has already been completed with the formation of the training set. The rules database and features scores calculated on the previous step are used for the ranking of the candidate words or phrases obtained from the new inquiry. The ranked candidate words or phrases may be stored in a ranked candidate database for further use by at least one of an analyst or a recommendation engine. In addition, the domain is determined by the entity to which the inquiry is directed. For example, inquiries to Gartner, Inc. will be assumed to be in the business domain; inquiries to an auto manufacturer will be assumed to be in the automotive technology domain. Thus, as shown in FIG. 3, for each new inquiry:

1) The new document or inquiry text 50 is entered (e.g., via a user device 60 as described in detail below in connection with FIG. 4). Sentences are extracted at a sentence extraction module 16 as discussed above in connection with FIG. 1. The sentences are then analyzed to determine whether any words or phrases from the text of the extracted sentences match any known entities/candidate words or phrases (e.g., at locate initial candidates module 18) that appear in the training set for the particular domain (stored in the ranked entities database 40). The text may be searched for matches with the known entities that appear in the ranked entities database 40 whether or not those known entities appear in lower case, initial capital letters, or upper case in the given text. The text is then analyzed to locate entities that appear with pre-words and post-words at located additional candidates module 22. New or additional candidate words or phrases can then be located using capital letter analysis as discussed above. This permits the determination of new candidate words or phrases that did not appear in the training set. Any new candidate words or phrases contained within the inquiry text may be analyzed as discussed above in connection with FIGS. 1 and 2 and added to the ranked entities database 40. These words or phrases can be added to the training set to provide continuous learning and adaption of the system in each domain.

2) The text is then re-analyzed at re-analyze module 26 as discussed above in connection with FIG. 1 to locate all possible additional candidate words or phrases. Any new candidate words or phrases located in this process can also be added to the ranked entities database 40.

3) The candidate words or phrases can be ranked at ranking module 52 using the coefficients and normalized rankings provided for corresponding features of the located entities in the training set obtained from the ranked entities database 40.

4) The candidate words or phrases can then be sorted at sorting module 54 by ranking score.

5) The ranked and sorted candidate words or phrases can then be stored and/or presented to the user, system analyst, or recommendation engine in or via a ranked candidates database 56 as ranked candidates determined from the inquiry text for further use.

As an example of a further use, a recommendation engine may recommend analysts, documents, or information sources in response to the text-based user inquiry based on the ranked candidate words or phrases. For example, the ranked candidate words or phrases may be submitted to the recommendation engine as key words or phrases.

Further, the ranked candidate words or phrases may be used to build a user profile for the user for use by the recommendation engine. The user may comprise one of an expert, an author, or the analyst.

The foregoing description of the handling of new inquiries assumes that the domain is known at the time of receipt of the new inquiry. However, those skilled in the art should appreciate that the system may work in multiple domains and in such embodiments the inquiries may be analyzed to determine the domain or domains to which it applies (e.g., using similar analysis of candidate words as discussed above). For this purpose, the ranked entities database 40 may include entities in multiple domains.

Figure 4:
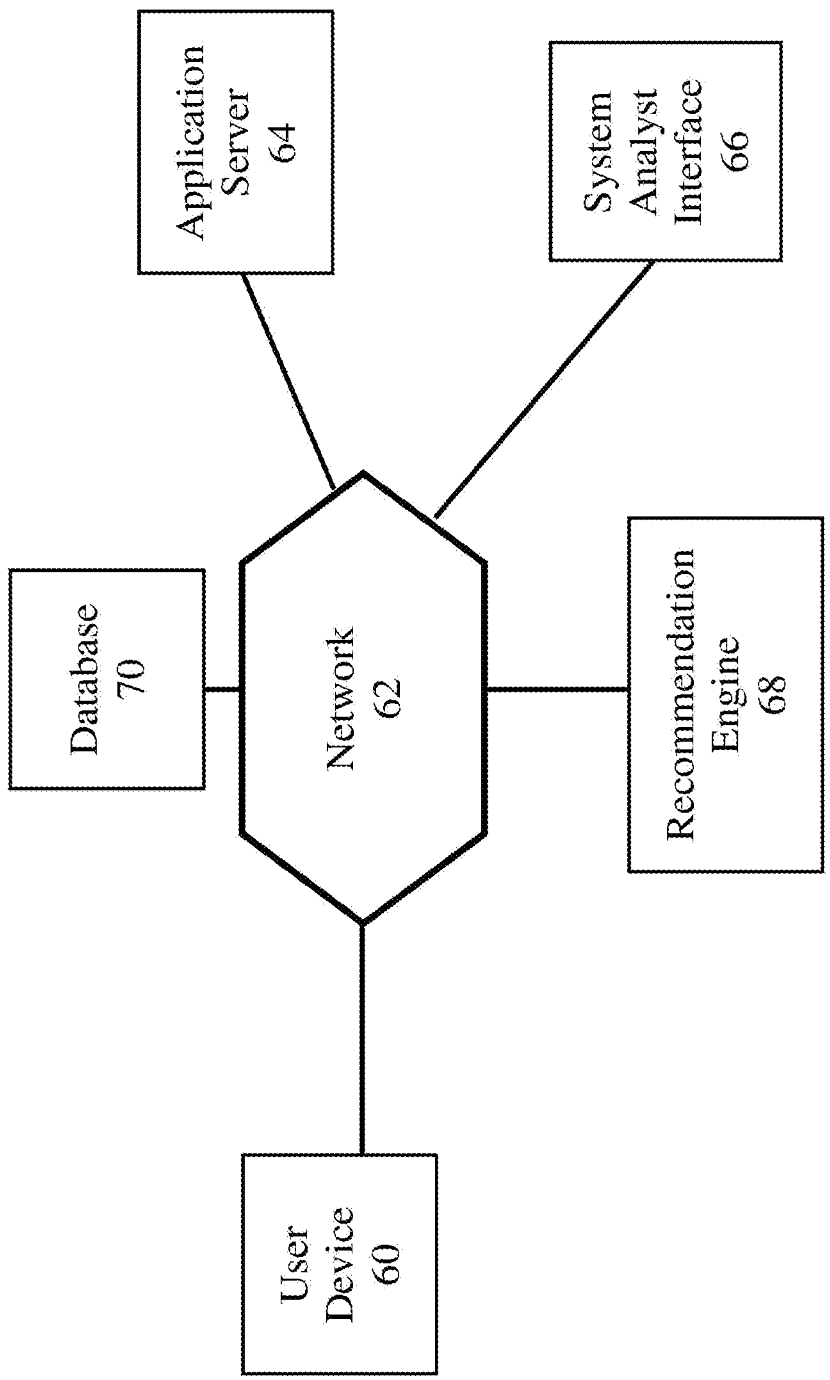
FIG. 4 shows a block diagram of an example embodiment of a system in accordance the present invention.

FIG. 4 shows an example embodiment of a system in accordance with the present invention. A user device 60 may connect to an application server 64 via a network 62. The application server 64 may contain the necessary hardware (computer processor, memory, and the like) and software for implementing the processes described in FIGS. 1-3. The application server 64 may be connected to one or more databases 70 via the network 62 (e.g., the various databases mentioned in FIGS. 1-3). A recommendation engine 68 may also be connected to the network 62. A system analyst interface 66 may be connected to the network 62 for communication with the user device 60, the database(s) 70, the application server 64, and the recommendation engine 68.

Only one user device 60 and system analyst interface 66 are shown for clarity, but it should be appreciated that multiple users and analysts may be present and have access the system at any given time. User device 60 and system analyst interface 66 may each comprise any type of computing device, including but not limited to a laptop computer, a desktop computer, a tablet computer, a smartphone, an Internet enabled device, or other type of computing device now known or to be developed.

It should also be appreciated that FIG. 4 shows one example embodiment only and that various components of the system may be implemented on a single computing device (e.g., the database 70 and application server 64 may be combined) or that each component may be comprised of several discrete components.

The client inquiry may be entered into the system via user device 60 and analyzed via the software running on the application server 64 as described above. Once ranked and sorted, the information (candidate words and/or phrases) from database 56, 70 can be used to recommend one or more analysts to answer the inquiry. For example, a screen can be provided to the client/user on the user device 60 showing the text inquiry, words in ranked order, and recommended analysts. The analysts may be shown with key words identifying areas of expertise that correspond to candidate words from the inquiry. Contact information may be provided for each analyst shown (e.g., name, email, chat or messaging link, telephone number, and the like). The analysts may also receive the information at the system analyst interface 66 prior to or upon being contacted by the user. The analyst may connect to the recommendation engine 68 and submit the ranked candidate words or phrases as one or more key word inquiries in order to obtain information responsive to the inquiry from a recommendation engine database.

Optionally the ranked candidate words or phrases may be submitted in one or more keyword searches directly to the recommendation engine 68, which may respond with recommended documents or other information sources, and/or recommended analysts with corresponding contact information.

It should now be appreciated that the present invention provides advantageous methods and systems for extracting and ranking entities in a specific domain.

Although the invention has been described in connection with various illustrated embodiments, numerous modifications and adaptations may be made thereto without departing from the spirit and scope of the invention as set forth in the claims.

What is claimed is:

1. A computerized method for finding and ranking domain-specific entities in a text-based inquiry, comprising:

analyzing existing text data sources to create a training set of data comprising ranked entities with associated weighted features within each of a plurality of domains;

storing the training set of data for each of the plurality of domains in a ranked entities database;

receiving a text-based inquiry from a user;

analyzing, within a specific one of the plurality of domains, the text-based inquiry to locate candidate words or phrases based at least in part on the ranked entities in the specific domain;

ranking the candidate words or phrases based on the features for corresponding entities from the training set; and storing the ranked candidate words or phrases in a ranked candidate database for further use by at least one of an analyst or a recommendation engine;

wherein:

the analyzing of the existing text data sources to create the training set of data comprises:

determining known entities for each of the domains from existing stored data;

determining training candidate words or phrases from stored human generated text by at least comparing text from the stored human generated text with the known entities;

storing the training candidate words or phrases in a training candidate repository;

ranking the training candidate words or phrases in the corresponding domain; and storing the ranked training candidate words or phrases as the ranked entities in the ranked entities database; and the comparing of the text from the stored human generated text with the known entities comprises:

extracting sentences from the stored human generated text which have less than a threshold number of capital letters;

locating words or phrases from the extracted sentences that contain capital letters, with exception of an initial word of each of the extracted sentences; and comparing the located words or phrases starting with a capital letter with the known entities and storing any matches in the training candidate repository as the training candidate words or phrases.

2. The method in accordance with claim 1, wherein the known entities include at least one of a person's name, a company name, a product name, a location, and other pre-defined terms for the corresponding domain.

3. The method in accordance with claim 1, wherein the determining of the training candidate words or phrases from the stored human generated text further comprises:

analyzing the text to locate words or phrases that come before and after the stored training candidate words or phrases; and comparing the words or phrases that come before and after the stored training candidate words or phrases with the known entities and storing any matches in a word repository.

4. The method in accordance with claim 3, further comprising:

analyzing the words or phrases that come before and after the training candidate words or phrases to locate any repeatedly used words or phrases; and storing any repeatedly used words or phrases in the word repository.

5. The method in accordance with claim 4, further comprising:

reanalyzing the text using the words or phrases stored in the word repository to locate additional training candidate words or phrases and storing the additional training candidate words or phrases in the training candidate repository.

6. The method in accordance with claim 5, further comprising:

running a cleaning process on the training candidate words or phrases, the cleaning process comprising removing at least one of: most common English language words; words or phrases that appear more than a threshold amount in the stored human generated text; words having less than a threshold number of characters; and words or phrases meeting predefined criteria for the corresponding domain.

7. The method in accordance with claim 6, further comprising:

running a stemming process on the remaining words or phrases, the stemming process comprising reducing the words or phrases to a base form; and adding the base form of the remaining words or phrases to the training candidate repository.

8. The method in accordance with claim 1, wherein the ranking of the training candidate words or phrases in the corresponding domain comprises:

subjecting the training candidate words or phrases stored in the training candidate repository to a series of ontology rules to extract features of the training candidate words or phrases; and utilizing relative importance of the extracted features of the training candidate words or phrases in the corresponding domain in the ranking of the training candidate words or phrases.

9. The method in accordance with claim 8, wherein the ontology rules comprise at least one of: determining if the training candidate word is part of a phrase; determining a number of words in a phrase; determining whether the training candidate word is a noun, a proper noun, a verb, or an adjective; determining how often the training candidate word or phrase is used in the text; determining if the training candidate word is a person's name, a name of a location, a name of a product, a name of a company, or an abbreviation; determining if the training candidate word appears before or after a verb; and determining if the training candidate word or phrase is in a passive voice.

10. The method in accordance with claim 8, wherein the extracted feature comprises one of a word, a phrase, a part of a sentence, a proper noun, a verb, a person, a location, a product, a company, or an abbreviation.

11. The method in accordance with claim 8, wherein the ranking of the training candidate words or phrases in the corresponding domain further comprises:

defining clusters for each of the domains, each of the clusters comprising a group of words with importance in the corresponding domain;

defining, for each cluster, a cluster center comprising a word with a high repetition of use in the text;

determining a distance between the training candidate word or phrase and the cluster center;

wherein the ranking is further based on how close the training candidate word or phrase is to the cluster center.

12. The method in accordance with claim 8, wherein the ranking of the training candidate words or phrases in the corresponding domain further comprises:

determining term relationships for the training candidate words or phrases within a corresponding domain;

the term relationships comprising at least one of: determining if the training candidate phrase contains any of the training candidate words or other of the training candidate phrases; determining how many times a training candidate word or phrase appears as a subportion in other of the training candidate phrases; determining how many portions of the training candidate phrase comprise other of the training candidate words or phrases; determining if the training candidate word or phrase is equivalent to another of the training candidate words or phrases; determining of the training candidate word or phrase is a same kind or type as another of the training candidate words or phrases; and determining if the training candidate word is part of another training candidate word;

wherein the ranking of the training candidate word or phrase is increased in accordance with the determined term relationship and predefined characteristics of the determined term relationship.

13. The method in accordance with claim 8, further comprising:

defining a score for each feature of the training candidate word or phrase;

applying a normalization process to each of the scores for each of the features to normalize the scores.

14. The method in accordance with claim 13, further comprising:

applying an algebraic weighting coefficient to the normalized score for the corresponding feature in order to raise or lower the ranking of the feature in the corresponding domain;

the algebraic weighting coefficient is determined based on machine learning from a training set manually created from a sampling of the training candidate words or phrases in the corresponding domain.

15. The method in accordance with claim 1, further comprising analyzing the text-based user inquiry to determine the specific domain of the text based user inquiry.

16. The method in accordance with claim 1, wherein:

the recommendation engine recommends analysts, documents, or information sources in response to the text-based user inquiry based on the ranked candidate words or phrases.

17. The method in accordance with claim 16, wherein the ranked candidate words or phrases are submitted to the recommendation engine as key words or phrases.

18. The method in accordance with claim 1, wherein:

the ranked candidate words or phrases are used to build a user profile for the user for use by the recommendation engine; and the user comprises one of an expert, an author, or the analyst.

19. A computerized method for finding and ranking domain-specific entities in a text-based inquiry, comprising:

analyzing existing text data sources to create a training set of data comprising ranked entities with associated weighted features within each of a plurality of domains;

storing the training set of data for each of the plurality of domains in a ranked entities database;

receiving a text-based inquiry from a user;

analyzing, within a specific one of the plurality of domains, the text-based inquiry to locate candidate words or phrases based at least in part on the ranked entities in the specific domain;

ranking the candidate words or phrases based on the features for corresponding entities from the training set; and storing the ranked candidate words or phrases in a ranked candidate database for further use by at least one of an analyst or a recommendation engine;

wherein the analyzing of the text-based inquiry to locate the candidate words or phrases comprises:

extracting sentences from the text-based inquiry which have less than a threshold number of capital letters;

locating words or phrases from the extracted sentences that contain capital letters, with exception of an initial word of each of the extracted sentences; and comparing the located words or phrases starting with a capital letter with known entities from the ranked entities database and storing any matches as candidate words or phrases.

20. The computerized method of claim 17, wherein the analyzing of the existing text data to create the training set of data comprises:

determining known entities for each of the domains from existing stored data;

determining training candidate words or phrases from stored human generated text by at least comparing text from the stored human generated text with the known entities;

storing the training candidate words or phrases in a training candidate repository;

ranking the training candidate words or phrases in the corresponding domain; and storing the ranked training candidate words or phrases as the ranked entities in the ranked entities database.

21. The method in accordance with claim 20, wherein the comparing of the text from the stored human generated text with the known entities comprises:

extracting sentences from the stored human generated text which have less than a threshold number of capital letters;

locating words or phrases from the extracted sentences that contain capital letters, with exception of an initial word of each of the extracted sentences; and comparing the located words or phrases starting with a capital letter with the known entities and storing any matches in the training candidate repository as the training candidate words or phrases.

22. The method in accordance with claim 19, further comprising:

analyzing the text-based user inquiry to locate words or phrases that come before and after the stored candidate words or phrases; and comparing the words or phrases that come before and after the stored candidate words or phrases with the known entities and storing any matches as candidate words or phrases.

23. The method in accordance with claim 22, further comprising:

analyzing the words or phrases that come before and after the stored candidate words or phrases to locate any repeatedly used words or phrases; and storing any repeatedly used words or phrases as candidate words or phrases.

24. The method in accordance with claim 23, further comprising:

reanalyzing the text-based user inquiry using the stored candidate words or phrases to locate additional candidate words or phrases.

25. The method in accordance with claim 24, wherein any additional candidate words or phrases located during at least one of the analyzing of the words or phrases that come before and after the candidate words or phrases or the reanalyzing of the text-based user inquiry are stored as ranked entities in the ranked entities database.

26. The method in accordance with claim 24, further comprising:

applying the weighted features associated with the ranked entities to the corresponding candidate words or phrases to provide the ranked candidate words or phrases;

sorting the ranked candidate words or phrases; and storing the sorted and ranked candidate words or phrases in the ranked candidate database.

27. A computerized system for finding and ranking domain-specific entities in a text-based inquiry, comprising: one or more user devices adapted to be connected over a network; one or more databases accessible via the network; an application server comprised of a computer processor and memory adapted for analyzing existing text data sources obtained from the one or more databases to create a training set of data comprising ranked entities with associated weighted features within each of a plurality of domains; a ranked entities database for storing the training set of data for each of the plurality of domains; wherein the application server is further adapted for: (a) receiving a text-based inquiry from a user via one of the one or more user devices; (b) analyzing, within a specific one of the plurality of domains, the text-based inquiry to locate candidate words or phrases based at least in part on the ranked entities in the specific domain; and (c) ranking the candidate words or phrases based on the features for corresponding entities from the training set; and a ranked candidate database for storing the ranked candidate words or phrases; and at least one of a system analyst interface and a recommendation engine that receives the ranked candidate words or phrases and provides recommended analysts, documents, or information sources in response to the text-based user inquiry based on the ranked candidate words or phrases; wherein: the analyzing of the existing text data sources obtained from the one or more databases to create a training set of data comprises: determining known entities for each of the domains from existing stored data; determining training candidate words or phrases from stored human generated text by at least comparing text from the stored human generated text with the known entities; storing the training candidate words or phrases in a training candidate repository; ranking the training candidate words or phrases in the corresponding domain; and storing the ranked training candidate words or phrases as the ranked entities in the ranked entities database; and the comparing of the text from the stored human generated text with the known entities comprises: extracting sentences from the stored human generated text which have less than a threshold number of capital letters; locating words or phrases from the extracted sentences that contain capital letters, with exception of an initial word of each of the extracted sentences; and comparing the located words or phrases starting with a capital letter with the known entities and storing any matches in the training candidate repository as the training candidate words or phrases.

28. A computerized system for finding and ranking domain-specific entities in a text-based inquiry, comprising: one or more user devices adapted to be connected over a network; one or more databases accessible via the network; an application server comprised of a computer processor and memory adapted for analyzing existing text data sources obtained from the one or more databases to create a training set of data comprising ranked entities with associated weighted features within each of a plurality of domains; a ranked entities database for storing the training set of data for each of the plurality of domains; wherein the application server is further adapted for: (a) receiving a text-based inquiry from a user via one of the one or more user devices; (b) analyzing, within a specific one of the plurality of domains, the text-based inquiry to locate candidate words or phrases based at least in part on the ranked entities in the specific domain; and (c) ranking the candidate words or phrases based on the features for corresponding entities from the training set; and a ranked candidate database for storing the ranked candidate words or phrases; and at least one of a system analyst interface and a recommendation engine that receives the ranked candidate words or phrases and provides recommended analysts, documents, or information sources in response to the text-based user inquiry based on the ranked candidate words or phrases; wherein the analyzing of the text-based inquiry to locate the candidate words or phrases comprises: extracting sentences from the text-based inquiry which have less than a threshold number of capital letters; locating words or phrases from the extracted sentences that contain capital letters, with exception of an initial word of each of the extracted sentences; and comparing the located words or phrases starting with a capital letter with known entities from the ranked entities database and storing any matches as candidate words or phrases.

* * * * *

UNITED STATES PATENT AND TRADEMARK OFFICE

CERTIFICATE OF CORRECTION

PATENT NO. : 10,586,174 B2
APPLICATION NO. : 15/422586
DATED : March 10, 2020
INVENTOR(S) : G. Lev It is certified that error appears in the above-identified patent and that said Letters Patent is hereby corrected as shown below:

In the Claims

Column 17, Line 63:
"20. The computerized method of claim 17, wherein the"
Should read:
-- 20. The computerized method of claim 19, wherein the --

Signed and Sealed this
Twenty-fourth Day of May, 2022

Katherine Kelly Vidal

Katherine Kelly Vidal
*Director of the United States Patent and Trademark Office*